Inventor
Anton P. Kjerulff
By Munn, Liddy, Glaccum & Rich
Attorneys

Patented June 19, 1951

2,557,119

UNITED STATES PATENT OFFICE 2,557,119

SECTIONAL SEWER ROD AND A SWIVEL COUPLING THEREFOR

Anton P. Kjerulff, Lake Charles, La.

Application November 16, 1945, Serial No. 629,141

2 Claims. (Cl. 287—103)

My present invention has for its object to provide an improved sewer or pipe cleaning rod by making a flexible rod, of a length adapted to reach remote points, in sections which are connected for continuity and each which may be disconnected as occasion requires from an adjacent section to permit its independent rotation.

My invention also comprehends a novel form of swivel connection as a means of uniting a number of sections of a pipe or sewer cleaning rod the use of which will enable such rods to be used in much greater lengths than heretofore, inasmuch as it permits the forward end of the extended rod to be manipulated or rotated without turning the rear end or that portion which has not been fed into the pipe or sewer.

To these and other ends my invention also comprises further improvements all as will be fully described in the accompanying specification, the novel features thereof being set forth in the appended claims.

In the drawings.

Similar reference numerals in the several figures indicate similar parts.

Obstructions in pipes and sewers often lie at considerable distances from the available points at which cleaning rods may be introduced, such as manholes or inlets of sewers, or the drain inlets and traps of piping connections, so that the lengths of the rods required to reach obstructions become unwieldly. This is especially so in the use of flexible rods which heretofore have been made in continuous lengths so that in twisting them to feed the cutters at their forward ends around bends and to bore into the obstructions much inconvenience is experienced in both inserting and removing them and the time consumed in these manipulations has been excessive.

In order to overcome the aforesaid difficulties and other objections in handling long rods I cut them into sections of convenient length, such as eight or ten feet, and swivel them together in such a manner that they may be twisted individually each succeeding section automatically hooking onto a preceding section and automatically unhooking itself from the section immediately following it but without breaking the continuity of the rod as a whole.

Figure 1:
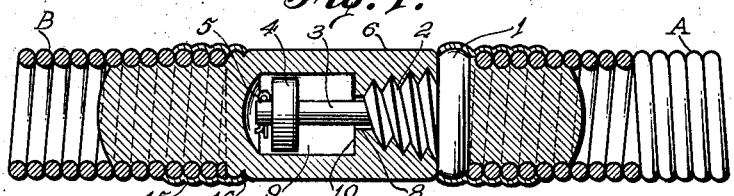
Figure 1 is a view showing the contiguous ends of two rod sections, indicative of a number of such sections in a single rod, illustrating one form of my invention.
Figure 2:
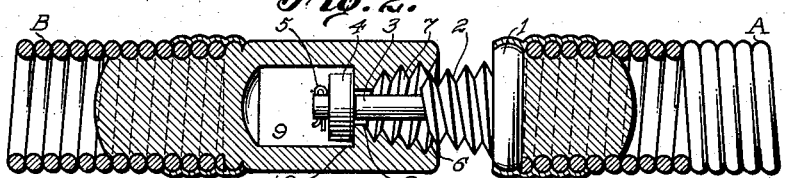
Figure 2 is a longitudinal central sectional view of the parts shown in Fig. 1.

In illustrating my invention I have shown in Fig. 1 the adjacent ends of two sections of a flexible sewer rod, indicated by A and B which may be composed of one or more layers of closely wound spring wire. In the end of section A is secured a coupling member or head 1 having a tapered quick thread 2 from which projects a post 3 carrying a washer 4 having a limited movement thereon between the thread and a cotter key 5. Secured on the end of section B is a recessed head 6 provided with a counterpart 7 of screw thread 2 and an aperture 8 through which the post 3 extends. The head 6 is also provided with a transverse aperture 9 which accommodates the inward movement of the post 3 and its washer when the threads of the two heads are united. The forward end of this aperture provides a shoulder or stop 10 against which the washer 4 abuts to limit the separating movement of the heads when they are unscrewed, as shown in Fig. 2.

Figure 3:
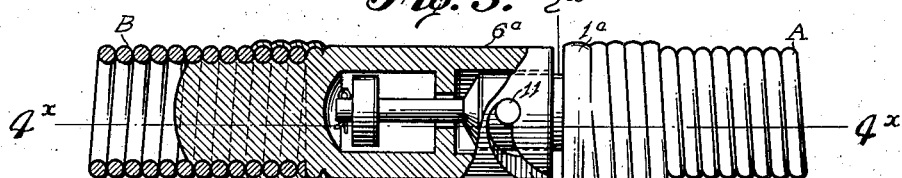
Figure 3 is a view similar to Fig. 1 showing a modified form of the invention.
Figure 4:
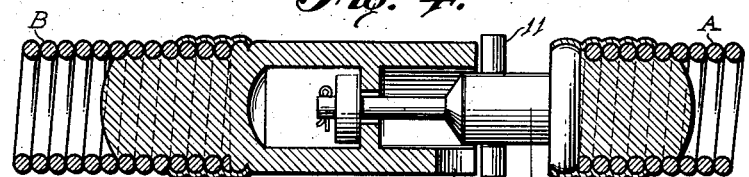
Figure 4 is a central lengthwise section of the structure shown in Fig. 3 taken on the line 4x—4x thereof.

In Figs. 3 and 4 I have shown as a substitute for the screw threads a somewhat simpler construction in which the head 1a has a cylindrical portion 2a carrying a cross pin 11 the ends of which hook into diametrically located slots 12 in the head 6a, when the head is rotated relatively to the other. In using this form of connection I prefer to offset the bottoms of the slots slightly, as shown, to provide recesses into which the ends of the pin drop to somewhat retard and also to prevent their accidental disconnection.

In the constructions described the coupling heads have been illustrated as having plug ends fitting within the convolutions of the sections A and B, they being provided with threads fitting the guage of the wire. When the heads are seated they should be brazed to the wire and if desired their connection may be further assured by enclosing a few of the wire coils in a sleeve 15, as shown in Fig. 2, the end of which may be crimped into a groove 16 on the head.

Figure 5:
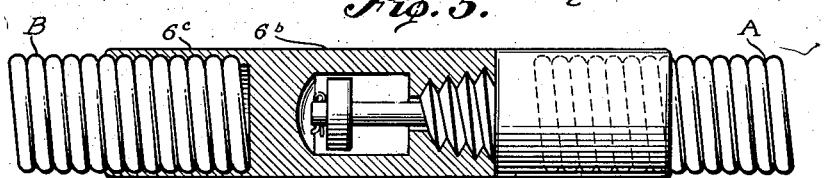
Figure 5 is a view similar to Fig. 2 showing the coupling members embracing the exterior of the flexible rod.

With some makes of flexible rods it is desirable to connect the coupling heads to their exteriors. This may be done as illustrated in Fig. 5 in which the heads, designated as 1b and 6b are provided with sleeves 1c and 6c, respectively, which are threaded interiorly and screw over the ends of the coils A and B to which they are also permanently secured by soldering or brazing.

Figure 6:
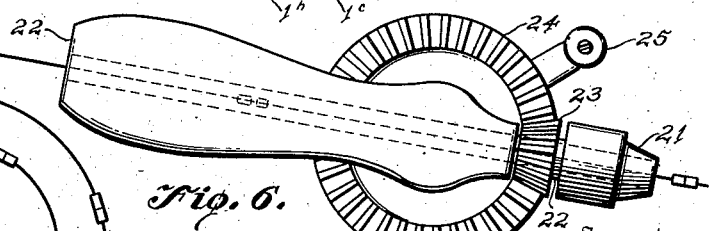
Figure 6 is a diagrammatic view showing a rod comprising a plurality of sections coiled and its free end leading through a tool for revolving the sections successively.

In Fig. 6 I have shown diagrammatically a coil of flexible sewer rod, generally indicated by 20, made of a plurality of short connected sections, together with a suitable tool through which its leading end is fed. The tool comprises a chuck 21 carried on a hollow spindle at the end of a hollow handle 22 and is rotated by burl pinion 23 driven by a larger burl gear wheel 24 having an operating arm and knob 25.

In the operation of a sewer rod constructed according to my invention if it is of any considerable length, and a length of 100 feet or more is often required, it is coiled as shown in Fig. 6 and its outer or free end, carrying a cutter, is introduced in a pipe or sewer opening and fed thereinto with a rotary motion. The rotation of the leading section unscrews it from the following section but when the second section is advanced and rotated the coupling heads being guided and centered one upon the other the threads on each engage. Thus the rotary movement of the second section causes the first section to continue to revolve. This action is repeated as successive rod sections are brought into play. It will be seen from the foregoing that in the construction I have provided the unexpended portion of the coil 20 remains at rest and there is no necessity for turning the coil as a whole over and over in order to rotate its leading end. Coils of sewer rods equipped according to my invention can be used in much greater length than heretofore and operated conveniently in cramped or close quarters which are too small to permit the bodily rotation of the coil.

What I claim and desire to protect by Letters Patent is:

1. A connection for joining rod sections comprising two heads fitted on the ends of said sections and having end faces, one head having a transverse aperture forming a shoulder spaced from its end face and a recess in its end face extending through the shoulder, the other head being provided on its face with a boss fitting the recess and a stud thereon projecting into the transverse aperture, said boss and recess being provided with quick interlocking parts engageable upon the relative rotation of the heads, and a washer insertable through the aperture and mounted on the stud and cooperating with the shoulder to limit the longitudinal movement of the heads when they are disconnected.

2. The combination with a plurality of rod sections, each provided on its forward end with a coupling member having a forward recess and an opening in rear thereof forming a shoulder, of cooperating coupling members attached to the rear ends of successive rod sections, each provided with a boss fitting the recess of the coupling of the following rod section, and having a stud extending into the opening and including a stop means on the free end thereof, complementary with the opening which cooperates with the opening's shoulder to limit the separation of the thus loosely connected couplings and maintain them in axial alinement, an interlocking means on the boss of one coupling member and the recessed end of the other coupling member for rigidly connecting them upon relative longitudinal movement of adjacent rods and rotation of a rear rod section in one direction relatively to a preceding section.

ANTON P. KJERULFF.

REFERENCES CITED

The following references are of record in the file of this patent:

UNITED STATES PATENTS

| Number | Name | Date |
|---|---|---|
| 111,453 | Hirsh et al. | Jan. 31, 1871 |
| 797,415 | Eder | Aug. 15, 1905 |
| 1,650,301 | Risher | Nov. 22, 1927 |
| 1,681,699 | Coates | Aug. 21, 1928 |
| 1,860,395 | Pence | May 31, 1932 |
| 1,963,561 | Sanger | June 19, 1934 |
| 2,079,692 | Lapointe | May 11, 1937 |
| 2,135,487 | Askue | Nov. 8, 1938 |
| 2,298,516 | Streib | Oct. 13, 1942 |
| 2,300,711 | Staerker | Nov. 3, 1942 |
| 2,318,839 | Crickmer | May 11, 1943 |
| 2,328,988 | Martin | Sept. 7, 1943 |
| 2,441,188 | Earhart | May 11, 1948 |